(No Model.) 2 Sheets—Sheet 1.
E. G. VAN PELT.
SEED PLANTER AND FERTILIZER DISTRIBUTER.
No. 398,477. Patented Feb. 26, 1889.
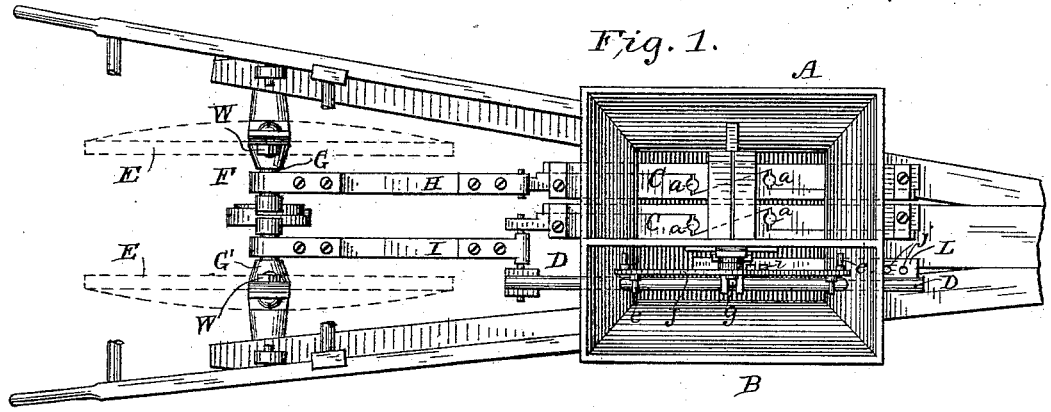
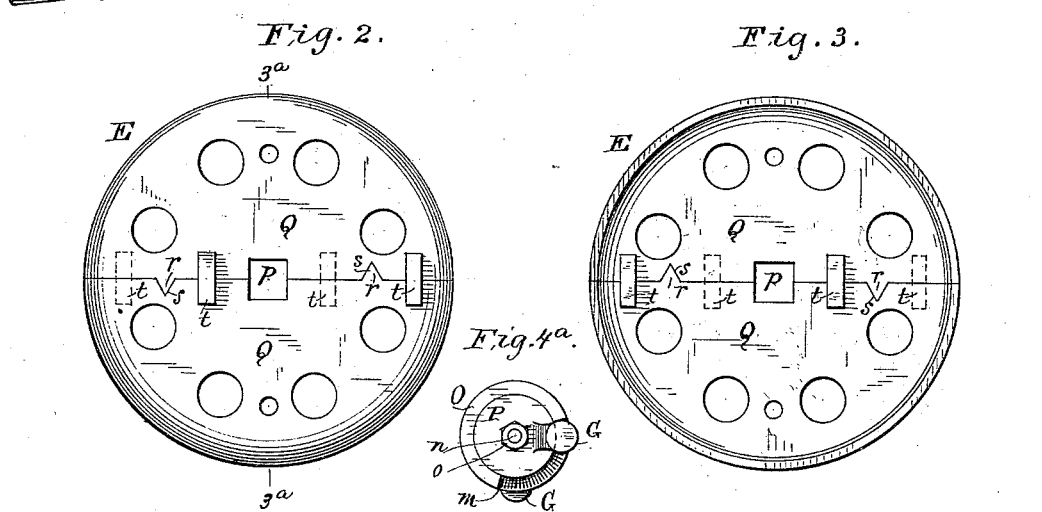
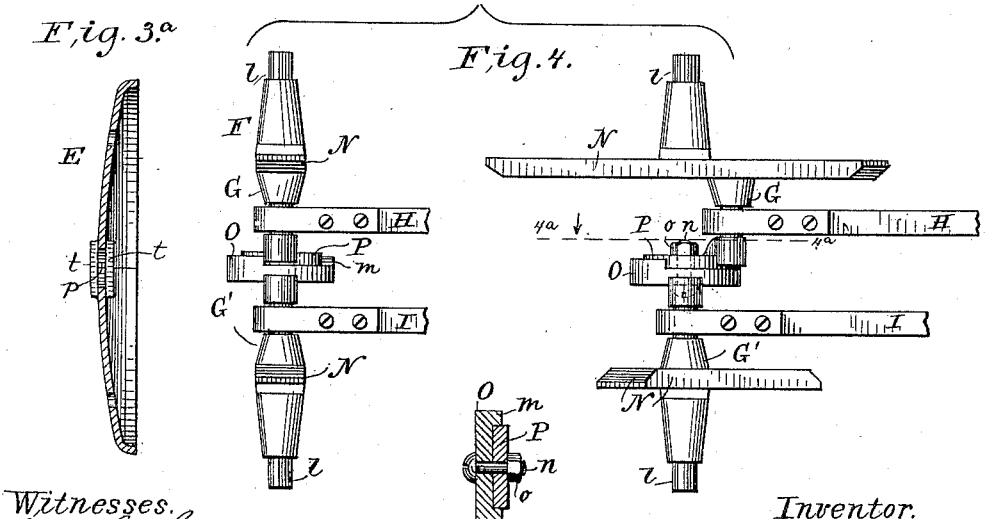
Witnesses.
Jos. S. Latimer
A. Paul Spencer
Inventor.
E. Gerry Van Pelt.
By his Attorney
Arthur B. Browne (No Model.) 2 Sheets—Sheet 2.
E. G. VAN PELT.
SEED PLANTER AND FERTILIZER DISTRIBUTER.
No. 398,477. Patented Feb. 26, 1889.

Witnesses
Jos. S. Latimer
A. Paul Spencer

Inventor.
E. Gerry Van Pelt
By his Attorney
Arthur B. Browne

UNITED STATES PATENT OFFICE.

ELBRIDGE GERRY VAN PELT, OF CENTRE HALL, PENNSYLVANIA.

SEED-PLANTER AND FERTILIZER-DISTRIBUTER.

SPECIFICATION forming part of Letters Patent No. 398,477, dated February 26, 1889.

Application filed May 1, 1886. Serial No. 200,854. (No model.)

*To all whom it may concern:*

Be it known that I, ELBRIDGE GERRY VAN PELT, a citizen of the United States, residing at Centre Hall, in the county of Centre and State of Pennsylvania, have invented certain new and useful Improvements in Seed-Planters and Fertilizer-Distributers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The present invention relates to the same class of seeding and fertilizing machines as is described in my pending application filed May 1, 1883, Serial No. 96,563; and the invention consists in certain improvements on the construction therein set forth. The general features of that machine are still retained—such as the two seed-slides, each having two dropping-apertures, the single fertilizer-dropper with an overhanging guard or cut-off, and a right-angled crank-shaft for operating the two seed-slides independently.

The principal improvements consist in the mechanism for depositing the fertilizing material, in rendering the two cranks of the axle adjustable in reference to each other, and in an improved construction of the driving-wheels, so that they may be readily removed and others of different size substituted in their stead. These improvements are illustrated in the accompanying drawings, in which—

Figure 5:
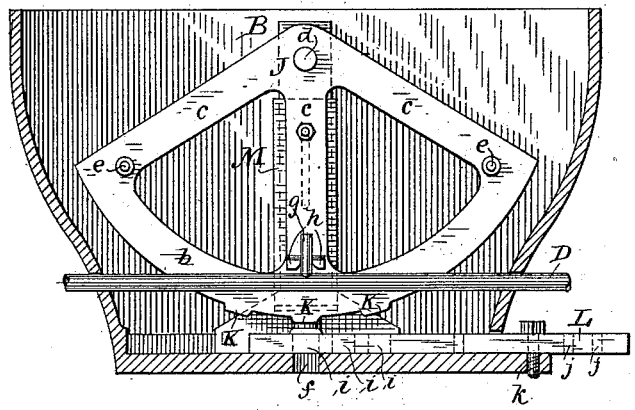
Figure 6:
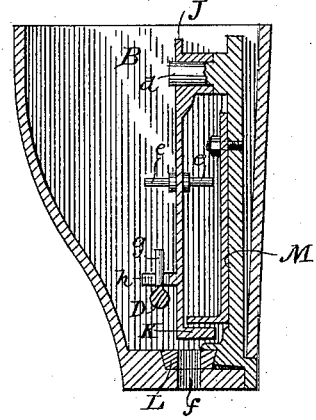
Figure 7:
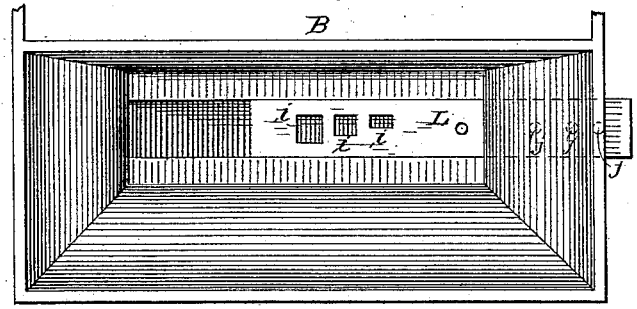
Figure 9:
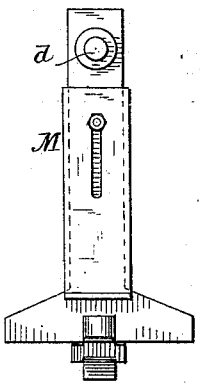
Figure 8:
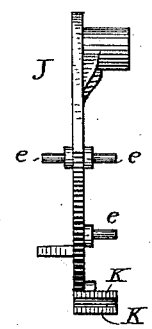

Figure 1 is a plan view of the machine. Fig. 2 is a side view of one of the wheels. Fig. 3 is an inside view of the same. Fig. 3ª is a cross-section of one of the wheels in a plane indicated by the line 3ª 3ª in Fig. 2. Fig. 4 shows details of the crank-adjusting mechanism. Fig. 4ª is a section of the crank-shaft, showing the crank-adjusting mechanism, being in a plane indicated by the line 4ª 4ª in Fig. 4. Fig. 5 is a side view of the fertilizing-compartment, the outer casing being removed. Fig. 6 is a vertical central cross-section of the same. Fig. 7 is a view of the bottom of the fertilizer-compartment, showing the adjustable feeding-slide. Fig. 8 shows details of the swinging fertilizer-distributer, and Fig. 9 shows details of the adjustable cut-off.

A is the seed-compartment, and B the fertilizer-compartment, of the hopper. C C are the two reciprocating seed-slides, each provided with two dropping-apertures, $a$ $a$. D is the reciprocating fertilizer-rod. E E are the driving-wheels. F is the rotatively-mounted axle, having two cranks, G G'. H is the connecting-rod connecting one of the cranks, G, to one of the seed-slides C, and I is the connecting-rod connecting the remaining crank, G', to the remaining seed-slide C and to the fertilizer-rod D. This arrangement and its resulting operation and purposes are the same as in the prior application. The seed-slides and the arrangement of devices in the seed-compartment are also identical with the similar parts in the prior application. The mechanism, however, described in said prior application for depositing the fertilizer is open to a serious objection in practice. The reciprocating seed-slide therein shown packs the fertilizer against the ends of the fertilizer-compartment, the result being that every little while it is necessary to stop the machine and repulverize the fertilizer. To obviate this difficulty a swinging fertilizer-distributer has been substituted for the reciprocating slide, and in this connection other improvements have also been introduced.

Referring to Figs. 5 to 9, J is the swinging fertilizer-distributer. This distributer is in the shape of the sector of a circle, and it is formed with a curved bottom piece, $b$, constituting the arc of the circle, and three radial arms, $c$ $c$ $c$. At the upper point, where the three radial arms meet, the sector is pivoted to a pivot-pin, $d$, fixed at the center and near the upper part of the fertilizer-chamber. The distributer thus swings in an arc corresponding to its bottom piece, $b$, and, the sides of the fertilizer-compartment being similarly curved, the distributer swings freely and without clogging. Any fertilizing material displaced by the distributer is thrown upward and falls back again loosely into the chamber. The distributer is provided with several laterally-extending stirring-pins, $e$ $e$, which keep the fertilizing material in a pulverized condition. On its lower edge, on the side adjacent to the inner wall of the chamber, the distributer is formed with three horizontally inwardly projecting arms, K K. The central one of these arms is located at the center of the arc $b$, and the other two are located on each side thereof at distances equal to the extent of the movement of the sector to either side of a central line. The discharging-aperture $f$ in the bottom of the compartment is located at the longitudinal center thereof, and when the sector is at its central or vertical position the central arm is directly over the discharging-aperture. The movement of the sector to either side is sufficient to bring one of the side arms, K, across the central discharge-aperture. In thus swinging across the discharge-aperture the phosphate (where a phosphate is the fertilizing material employed) retained in the two spaces between the three arms is carried across the discharge-aperture, and thus in each complete oscillation of the sector the phosphate will be deposited four times. Since the seed is dropped four times by the seed-slides, as set forth in application No. 96,563, it is essential that the phosphate should be deposited as many times and simultaneously, as is the case with this swinging sector. The sector is oscillated by being connected with the reciprocating-rod D. This rod is cylindrical, and, extending at all times through apertures at both ends of the chamber, the reciprocation can in no manner compact the phosphate. Within the chamber this rod carries a vertically-extending pin, $g$, which is held between two horizontally-extending arms, $h\ h$, on the sector. The reciprocation of the rod D brings the pin $g$ alternately in contact with the pins $h\ h$, thus oscillating the sector, the pin $g$ being of sufficient length so as not to become disengaged from between the arms $h\ h$ when the latter are elevated by the movement of the sector.

In order to vary the quantity of phosphate which may be deposited, an adjustable dropping-slide, L, is provided. This slide is located on the bottom of the compartment B above the discharge-aperture, and it is formed with a series of apertures, $i\ i\ i$, of different size, which are adapted to be brought into coincidence with the discharge-aperture. This slide extends out at one end of the compartment, and is provided with a series of bolt-holes, $j\ j\ j$, which are adapted to coincide with an aperture, $k$, on an exterior extension of the hopper-bottom, and the slide is held in the desired position by a bolt. The bolt-holes are one greater in number than the apertures $i\ i$, so that the slide may be fixed in such a position as to leave the entire area of the discharge-aperture $f$ exposed. An adjustable guard or cut-off plate, M, is also provided, as in application No. 96,563, which overhangs the discharge-aperture $f$ above the line of the path of the arms K K, in order to prevent the pouring of the phosphate through the same. This cut-off is vertically adjustable, as in said application, so as to regulate the flow of the phosphate so that it may be dropped twice or four times with each oscillation of the sector, upon the same principle and for the same reasons as those set forth in said application.

In application No. 96,563, in order to operate the three sides synchronously, it is necessary to uncouple and entirely remove one of the connecting-rods and then to adjust the coupling-rod. This renders the adjustment too difficult; and a further object of this invention is to render this adjustment more ready in accomplishment. In the present case the adjustment is accomplished by rendering the two cranks G G' of the axle adjustable in reference to each other.

The axle F is a divided one, and has two rotatively-mounted bearing-studs, $l\ l$, to which are secured cross-bars N N at right angles thereto. One of these bars carries the crank G and the other the crank G'. The division of the axle is between the two cranks. One crank, G, carries a wheel, O, which has an annular flange, $m$, on its outer face, and the other crank, G', has a smaller wheel, P, which rests in the flange of the larger wheel. These two wheels are concentric with each other and with the axle F. Each wheel has an aperture through its center, and through these apertures is passed a headed and screw-threaded bolt, $n$. A nut, $o$, fitting on the end of this bolt, clamps the two wheels O P against each other in the desired position. As it is only necessary that the cranks should be adjusted to two positions—one at which they shall be at right angles to each other and the other at which they shall be parallel—the flange $m$ is cut away for the distance of about ninety degrees of the periphery of wheel O. The shoulders thus formed constitute stops for the crank G', so that when the crank reaches its limit of motion in either direction it will occupy one of the desired positions. The amount of the flange cut away will be ninety degrees plus the diameter of the crank. When the cranks are parallel, the three slides will move synchronously.

With each machine that is sold two or more sets of wheels of different diameters are furnished, so that the seeds may be planted at different distances apart. To this end each wheel E is made in two similar halves, Q Q. Each half has a half-square notch, $p$, at its center, so that when the two halves are placed together a square eye will be formed, which fits over the squared stud $l$ of the axle. Each half Q has also a triangular notch, $r$, and projection $s$ on its straight edge, which interlock with corresponding parts on the other half. Each half has also two locking projections, $t\ t$, one between the notch and the center eye and the other between the projection $s$ and the periphery of the half-wheel. The two halves are thus exactly alike and may be made from the same cast. When brought together, the locking projection locks the two halves together. Each half is also bolted to one of the bars N N on the axle F by bolts $w$. The wheels are thus securely held to the axle, and may be removed to be replaced by those of different size by simply removing the bolts $w$.

I claim as my invention—

1. The fertilizer-compartment having a discharge-aperture in the bottom thereof, and a swinging fertilizer-distributer in said compartment swinging in a vertical plane, and having its lower edge curved in an arc coinciding with that in which it swings, and horizontally-projecting arms on said distributer, which swing over said discharge-aperture, in combination with a cut-off located in the compartment above the discharge-aperture, beneath which said projecting arms swing, substantially as set forth.

2. The fertilizer-compartment having an aperture in the bottom thereof and the swinging fertilizer-distributer having three horizontally-extending arms which swing across said aperture, in combination with a vertically-adjustable cut-off above said aperture and above the path of said horizontal arms, substantially as set forth.

3. The fertilizer-compartment and the swinging fertilizer-distributer within the same, said distributer having a curved side which coincides with the arc in which it swings, in combination with a reciprocating operating-rod connected with said distributer, said rod passing through both ends of the fertilizer-compartment, substantially as set forth.

4. The fertilizer-compartment and the swinging fertilizer-distributer within the same, said distributer having a curved side coinciding with the arc in which it swings, and having two horizontally-extending arms, $h\ h$, in combination with a reciprocating operating-rod passing through both ends of the fertilizer-chamber, said rod having a pin, $g$, which is located between said arms $h\ h$, substantially as set forth.

5. The divided axle, each division of which carries a crank, each of said cranks carrying a wheel concentric with the axle, said wheels being adjustable in relation to each other, substantially as set forth.

6. The double-cranked axle, the cranks of which are adjustable in reference to each other, in combination with two reciprocating seed-slides and one reciprocating fertilizer-rod, a connecting-rod connecting one of said seed-slides to one of said cranks, and a second connecting-rod connecting the remaining seed-slide and the fertilizer-rod to the remaining crank, substantially as set forth.

7. The divided wheel composed of two identical halves, each half having interlocking parts which interlock with the corresponding parts on the opposite wheel, substantially as set forth.

8. The axle having cross-bars N N, in combination with the divided wheels, the halves of which are bolted to said bars, substantially as set forth.

In testimony whereof I affix my signature in presence of two witnesses.

E. GERRY VAN PELT.

Witnesses:
ARTHUR S. BROWNE,
S. H. WALKER.